No. 682,590.  
T. J. GREER.  
GRADUATED LAWN OR GARDEN SPRINKLER.  
(Application filed Dec. 26, 1900.)
Patented Sept. 10, 1901.
(No Model.)
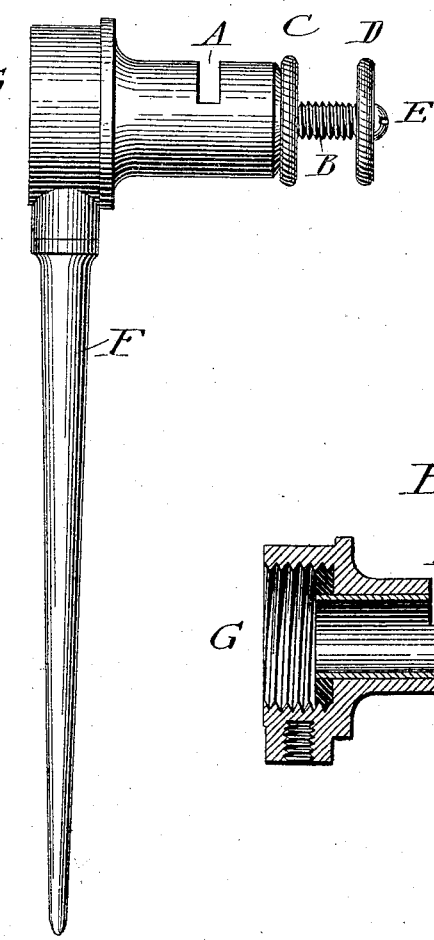
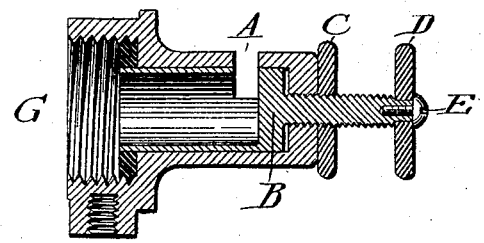
Witnesses:  
W. A. Mackinder  
L. G. Clark
Inventor.  
Thomas Jonston Greer

UNITED STATES PATENT OFFICE.

THOMAS JONSTON GREER, OF ST. HELENA, CALIFORNA.

GRADUATED LAWN OR GARDEN SPRINKLER.

SPECIFICATION forming part of Letters Patent No. 682,590, dated September 10, 1901.

Application filed December 26, 1900. Serial No. 41,126. (No model.)

*To all whom it may concern:*

Be it known that I, THOMAS JONSTON GREER, a citizen of the United States, residing at St. Helena, in the county of Napa and State of California, have invented a certain new and useful Improvement in Lawn or Garden Sprinklers, of which the following, taken with the accompanying drawings, is a specification.

My invention relates to an improvement in lawn and garden sprinklers, and has for its object the economical and local distribution of the supply of water, throwing the water in the form of a spray into the corners along the outer edges of the lawn and on long narrow beds without waste. I attain this object by the apparatus illustrated in the accompanying drawings, in which—

Figure 1 is a perspective view of my lawn and garden sprinkler. Fig. 2 is a section of same, showing the inside mechanism.

A is the slot through which the spray is ejected.

B is the device with which the spray is regulated and is composed of a cylindrical shell on one end and a screw-shank on the other. A slot is cut across the cylindrical shell B to correspond with the slot A.

In Fig. 1 C is a thumb-screw lock-nut for holding the regulating device B firmly in place. D is a thumb-screwing device by which the regulating device is turned to right or left and moved forward or back, thus regulating the volume and direction of the spray.

E is a lock-screw that holds D in place.

F in Fig. 1 represents the standard, which is thrust into the ground to hold the sprinkler in place.

G is the union where the sprinkler is screwed onto the hose.

The operation is as follows: After the sprinkler is united with the hose and placed in the desired position by thrusting the standard F in the ground the water is turned on and a beautiful spray is produced, which can be thrown forward or back by setting the standard F at the required angle or to right or left by turning the regulating device to right or left, as the case may require, or the spray may be reduced, if desired, by screwing down the regulating device, thus reducing the slot A.

Having thus described my invention, what I claim as new, and desire to secure by Letters Patent, is—

1. A lawn-sprinkler comprising two cylindrical shells one within the other, each having a transverse slot in the wall thereof, and means for imparting movement both longitudinally and transversely to said inner shell, substantially as described.

2. A lawn-sprinkler comprising two cylindrical shells one within the other, each having a transverse slot in the wall thereof, the inner one being provided with a stem extending through the end of the outer one, and means for imparting a rotary and longitudinal motion to said inner shell, whereby said slot-opening may be reduced longitudinally and laterally.

3. A lawn-sprinkler constructed of metal comprising two cylindrical shells one within the other, each having a transverse slot in the wall thereof, a perforation in the end of the outer shell, a threaded shank on the end of the inner shell threaded through said hole, and a thumb device for operating said stem, a lock-nut to hold said inner shell in its adjustment and a peg which is screwed or cast in the bottom side of said lawn and garden sprinkler to be thrust into the ground to hold same in place when in operation.

4. A lawn and garden sprinkler constructed of metal, comprising two cylindrical shells the one within the other, each having a corresponding slot cut squarely across the same, Fig. 1, the outer shell having a quarter-inch screw-hole in one end, and the inner, or B, a threaded shank on one end which screws into said hole, said shank having a thumb-screwing device fitted on the outer end with which B, the regulating device, is worked, and having a lock-nut C, to hold regulating device B, in place, substantially as described.

In testimony whereof I have signed my name to the foregoing specification in the presence of two subscribing witnesses.

THOMAS JONSTON GREER.

Witnesses:
F. B. MACKINDER,
E. MASON.